(No Model.) 2 Sheets—Sheet 1.
A. H. MOLESWORTH.
GEOCENTRIC ASTRONOMICAL CHART.
No. 521,725. Patented June 19, 1894.
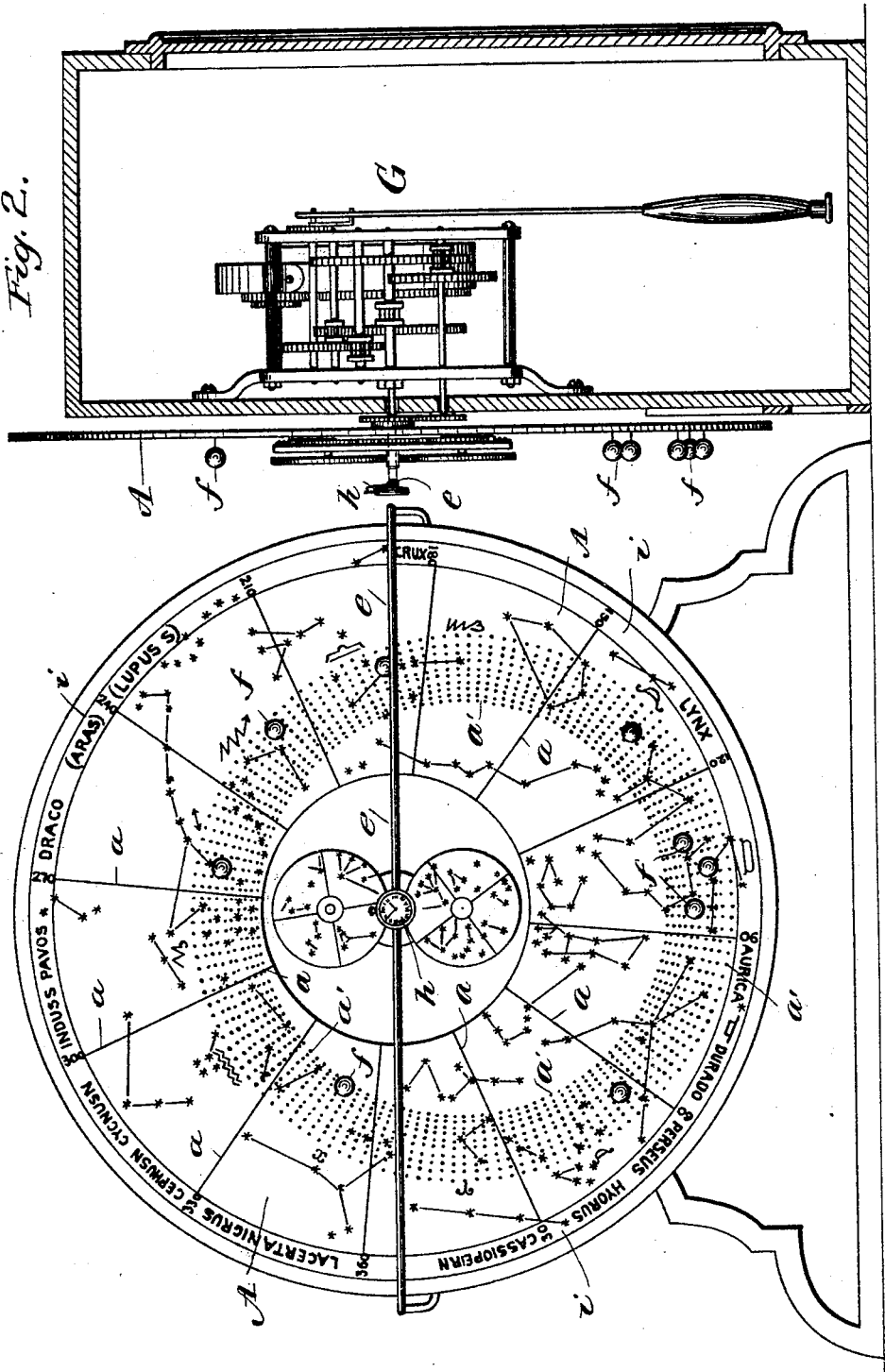
WITNESSES.
INVENTOR.
A. H. Molesworth
ATTORNEY.

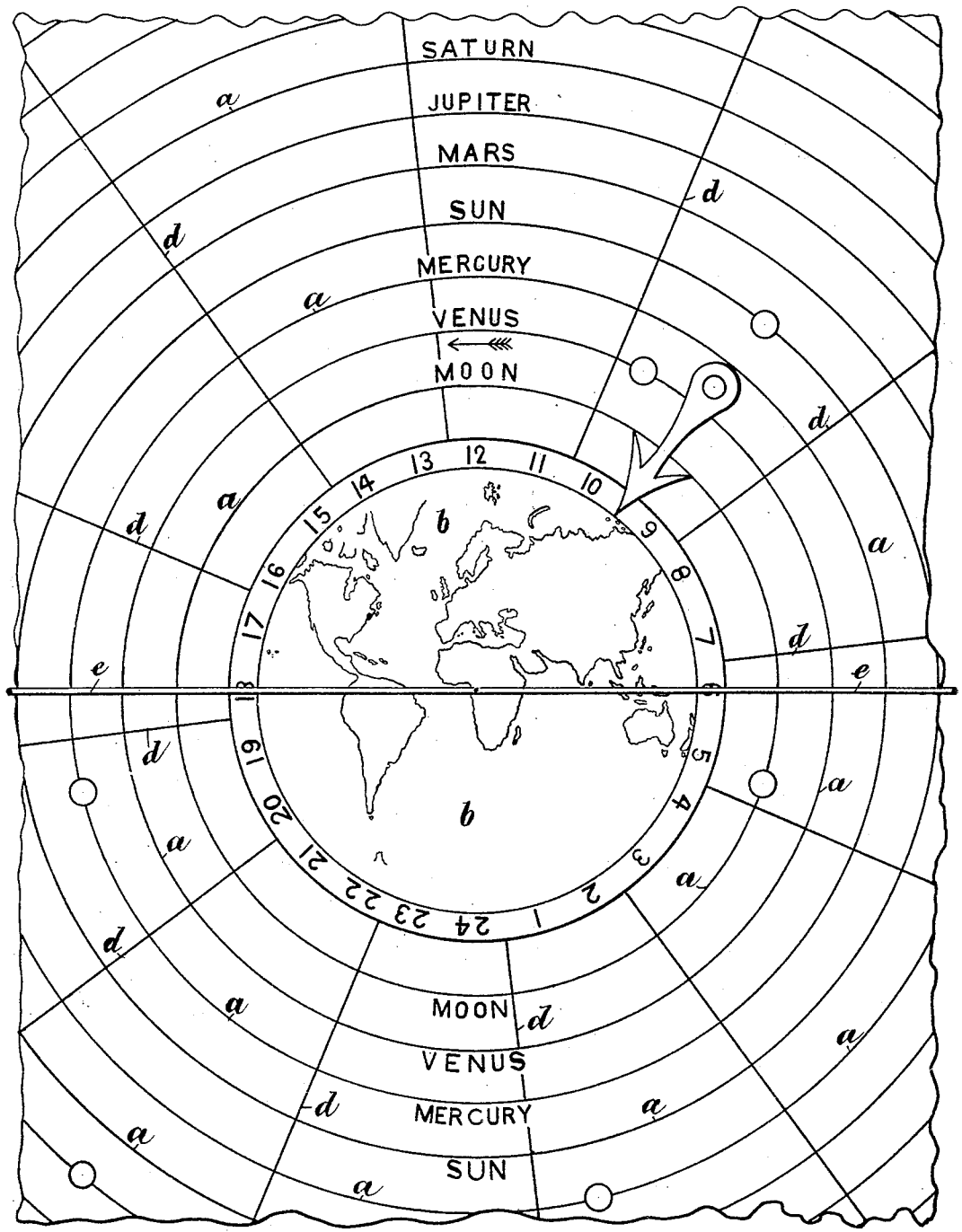

UNITED STATES PATENT OFFICE.

ARTHUR HILTON MOLESWORTH, OF LONDON, ENGLAND.

GEOCENTRIC ASTRONOMICAL CHART.

SPECIFICATION forming part of Letters Patent No. 521,725, dated June 19, 1894.

Application filed January 6, 1893. Serial No. 457,474. (No model.) Patented in England August 14, 1891, No. 13,748, and in France August 11, 1892, No. 221,181.

*To all whom it may concern:*

Be it known that I, ARTHUR HILTON MOLESWORTH, a subject of the Queen of Great Britain, residing at 15 Park Lane, London, in the county of Middlesex, England, have invented a certain new and Improved Geocentric Astronomical Chart, (the same having been in part patented to me in Great Britain August 14, 1891, No. 13,748, and in France August 11, 1892, No. 221,181,) of which the following is a specification.

This invention relates to a new and improved geocentric astronomical chart for indicating the apparent positions and movements of the bodies of the solar system with reference to the constellations of the zodiac.

In the drawings: Figure 1 is a front view of a celestium clock embodying my invention. Fig. 2 is a central vertical section thereof. Fig. 3 is a face view illustrating a different form of my invention.

In the said drawings, A represents a chart, preferably of flat circular form, and upon which, in the form of my invention shown in Fig. 1, appears a diagram of the constellations of the zodiac, the chart being divided into twelve parts, by the radiating lines $a$, one part for each constellation or sign of the zodiac. That part of the chart A on which is illustrated the portion of the heavens through which the bodies of the solar system appear to move is preferably provided with a number of small holes $a'$, which are adapted to receive pegs or pins carrying small spherical bodies $f$ designed to represent the bodies of the solar system. This arrangement permits the easy shifting of such bodies into a great variety of different relative positions, both with respect to each other, and to the constellations represented on the chart A, so that a representation of the heavens at any given time may be made. In this form of my invention the chart A—and with it the bodies $f$—is caused to revolve in a direction the reverse of that of the orbits of the planets, by suitable means, such as the clockwork G.

A clock dial $h$ is arranged opposite the center of the chart, over which move hands, operated by the mechanism G. As shown this clock dial is supported by a cross bar $e$, which also serves to divide the chart A into two equal parts and represents the earth's horizon. When the pointers indicate a given hour on the dial $h$, the planets and constellations of the zodiac which are above the earth's horizon lie above, or to one side of this bar $e$, while those which are below the earth's horizon are on the opposite side of such bar. By means of this simple apparatus the movements of the heavenly bodies are easily illustrated.

The clock mechanism, rotary dial, and cross bar $e$, are made to serve to automatically illustrate the position of the constellations as they appear, from any given place of observation at any time throughout the year.

The chart, as stated hereinbefore, carries with it the bodies $f$ which designate the bodies of the solar system, including with the planets the sun and moon, and as these bodies have an apparent movement through the constellations represented on chart, it is necessary that they should be moved from time to time. This is not attempted to be done automatically, as that would require complicated mechanism, but the user of the apparatus, as often as may be required, shifts the pegs carrying the bodies $f$ from one hole $a'$ to another to correspond with the position which they occupy relative to the zodiac. It will be understood that those bodies which are closest to the earth, as the moon, Mercury, &c., have to be shifted the most frequently.

In a circle $i$, surrounding the chart A are arranged the names and signs of the constellations of the zodiac.

The form of my invention shown in Fig. 3 is more simple than that shown in the other figures, and just described. It consists of a chart A divided by radiating lines $d$ into twelve parts, which correspond to the twelve parts of the zodiac, and which may be properly designated—preferably by signs and names arranged around the outer edge of chart as illustrated at $i$ in Fig. 3.

The paths of the bodies of the solar system are represented by concentric circles $a$, and small spheres $f$ represent such bodies, and are carried by pins which may be easily changed from one position to another upon the chart A, the chart being suitably constructed to permit the pins to be placed and held in any desired position.

The chart A is capable of being rotated, either automatically or by hand, and at the center of the chart there is a stationary disk or body $b$, which designates the earth, and may have marked thereon a representation of the earth's geographical divisions.

In this form of my invention the time is indicated by a pointer $j$ which is carried by chart A and moves over a stationary dial $h'$. The pointer $j$ is arranged opposite to the body $f'$ which designates the sun and points toward the center of the apparatus.

An astronomical ephemeris for the year is made use of in placing the bodies $f$ in position upon the chart.

The chart may be of any suitable size, the chart may be operated by any desired form of mechanism, and the form, size and color of the bodies $f$ may be varied to suit the fancy.

In the form of my invention which I have described, the earth has been considered and represented as the center of the system and hence a geocentric celestium is produced, but a heliocentric celestium is readily formed by the transposition and reversal of the spheres representing the sun and earth. In such case it is obvious that the spheres representing the moon, as the nearest body to the earth, and also Venus and Mercury, being the next nearest bodies, will accompany the earth and have their circles of motion reversed.

What I claim is—

1. A rotatory chart divided to represent the zodiac, a cross-bar arranged across the face of the chart to represent the earth's horizon and a series of removable bodies and means for attaching them to and causing them to move with the chart, substantially as described.

2. A rotatory chart divided to represent the zodiac, and marked to represent all possible positions of the bodies of the solar system with reference to the zodiac, in combination with a series of detachable bodies $f$ mounted upon pins adapted to engage with the said chart and be carried thereby, substantially as described.

3. The combination of a rotatory chart divided to illustrate the zodiac, a mechanism to rotate the same, a series of independent bodies adapted to be attached to the said chart and to move therewith, and to be moved by hand from one position to another thereon, substantially as set set forth.

4. The combination of a rotatory chart divided to illustrate the zodiac, a mechanism to rotate the same, a time indicating device operated by such mechanism, and the independent, detachable bodies which represent the bodies of the solar system, adapted to be attached by hand to the said chart in different positions and to move therewith when so attached, substantially as and for the purposes hereinbefore set forth.

ARTHUR HILTON MOLESWORTH.

Witnesses:
H. COULSON,
    54 *Fleet St., E. C.*
THOMAS LAKE,
    17 *Gracechurch Street, London.*